Figure 1:
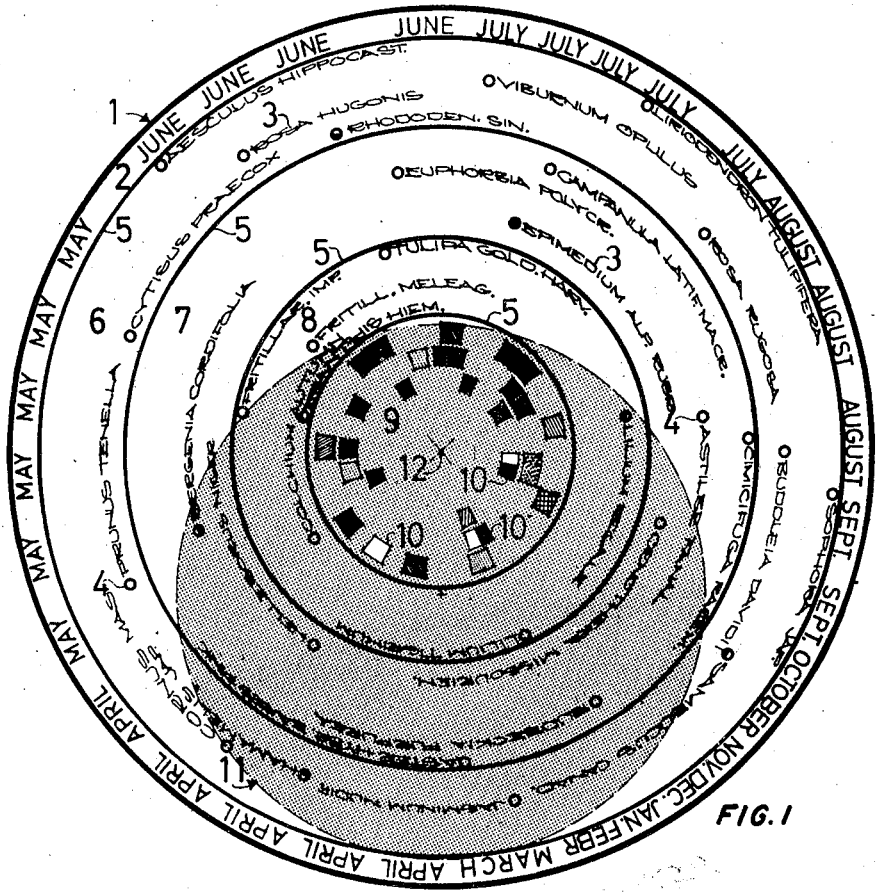

Magnus Hubert
Bogislav von Platen
INVENTOR.

BY Beale and Jones

United States Patent Office 3,248,049
Patented Apr. 26, 1966

3,248,049
DEVICE FOR DERIVING CORRELATIVE PARTICULARS ABOUT THE CHARACTERISTICS OF PLANT SPECIES DETERMINING THE COMPOSITION OF PLANT GROUPS IN GARDENS, PARKS AND THE LIKE
Magnus Hubert Bogislav von Platen, Baltzarsgatan 28, Malmo, Sweden
Filed Sept. 15, 1964, Ser. No. 396,621
Claims priority, application Sweden, Sept. 16, 1963, 10,114/63
3 Claims. (Cl. 235—88)

The present invention refers to a device for deriving correlative particulars about the average height, flowering-time and possibly other characteristics of individual plant species determining the composition of plant groups in gardens, parks and the like, the plant species being defined by identification marks, such as names, numbers or code signs.

The principal object of the invention is to provide a device of the kind indicated above which will facilitate the work of garden planners in composing groups of trees, bushes, perennials, bulbs and other horticultural plants to suit any particular wishes in respect of significant characteristics of such groups of plants.

The device is characterized by the fact that it is constructed as a table disk which is composed, in a manner known per se, of a bottom disk provided with circular scales and a top disk rotatable about the centre of said scales, said top disk having an index moving along one of the scales and a scale extending along an arc having a continuously decreasing distance from said centre, that the one of the scales of the bottom disk along which the index moves is a scale of time containing the months or weeks of the year and the remaining ones of the scales of the bottom disk contain the identification marks of the plant species arranged so that the radial distance of said marks from the centre is a measure for the average height of the plant species, and that the scale of the top disk is a scale of length, the peripheral positions of the identification marks of the plant species on their scales being selected so that on setting the top disk in an angular position in which its scale intersects the identification mark of a certain plant species, the index will indicate the flowering-time of the latter and the intersection point on the scale of the top disk will indicate the average height of the plant species.

To permit deriving also the colour of the flowers of the plant species from the device this is preferably further characterized by the fact that the bottom disk includes a number of separate squares or the like provided in one or more rings around the centre, said squares containing signs, e.g. consisting in different colouring or shading or in letters or numerals which represent the colour of the flowers, and the top disk has an aperture corresponding to the ring or each ring, respectively, of squares on the bottom disk, the colour of the flowers of a particular plant species being indicated in one of said squares through the said aperture or one of the said apertures in each angular position of the top disk in which the scale of the latter intersects the identification mark of said particular plant species.

Figure 2:
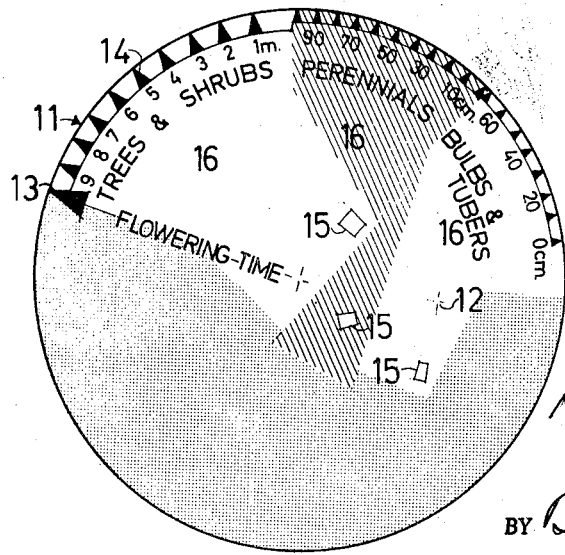

To illustrate the invention a device designed in accordance therewith will be described in the following with reference to the accompanying drawing, in which:

FIG. 1 is a plan view of the device, and
FIG. 2 is a plan view of a rotatable disk which forms part of the device and is indicated as a shaded field defined by a dash-line circle in FIG. 1.

Referring to the drawing, the device illustrated therein is designed as a table disk including a circular bottom disk 1 which at its periphery has a scale 2 of the months of the year and on which the Latin names 3 of plant species which are used in gardens are printed in several circular rings around the centre of the disk 1 at various radial distances from this centre. These distances from the centre of the disk 1 represent different values of the height of the plant species, and all plant species whose names are in the same ring are accordingly of about the same height. Furthermore, the peripheral distance in each ring, counted from a suitably chosen starting point, represents the flowering time of the various plant species included in the respective ring. In front of each name there is a reading mark 4 which defines the place of the respective plant species on the table more precisely than does the name itself. This mark 4 also serves to indicate, in a manner known per se, the light requirements of the plants, a non-filled ring signifying that the plant needs full sunshine, a half-filled ring signifying that the plant will thrive also in half-shade, and a completely filled ring signifying that the plant prefers shade to sunshine. The disk 1 is furthermore subdivided by concentric circles 5 into three annular fields, the outermost of which 6 contains the names of trees and bushes, i.e. the kinds of plants having the greatest height, the adjacent field within the said first one indicates the names of perennials and the innermost 8 of these fields indicates the names of bulb and tuber plants which belong to the lowermost ones of the kinds of plants occurring in gardens.

The circular field 9 inside the innermost circle 5 contains three concentric rings of squares 10 which are intended to represent the various colours of the flowers of the plants, e.g. by the squares being coloured in the respective colour or, as suggested in the drawing, having different kinds of shading or possibly comprising other designations, such as letters or numerals, of the various colours. Each ring of squares 10 corresponds to one of the fields 6, 7 and 8, i.e. to one of the three principal groups, viz trees and bushes, perennials, and bulbs and tuber plants. The colours of the flowers of the trees and bushes are thus found from the squares 10 in one of the rings, the colours of the perennials from the squares in a second ring and the colours of the bulb and tuber plants from the squares in the third one of the rings.

On top of the bottom disk 1 there is provided a top disk 11 which in the illustrated embodiment of the table disk is fully circular and which is rotatable in relation to the bottom disk, e.g. by means of a hollow rivet serving as an axle, about a point 12 coinciding with the centre thereof, said point, however, being eccentric in relation to the top disk itself. The size of the top disk and the degree of eccentricity are proportioned so that the point on the periphery of the top disk which is most remote from the turning point follows the scale 2 of the bottom disk, when the top disk is rotated. Yet, instead of the illustrated circular shape, the top disk may have any other suitable shape, provided only that it has a periphery which at least partly consists of an arc having a continuously decreasing distance from the turning point.

Near the said point on the periphery or arc, respectively, of the top disk 11, where the distance from the turning point is greatest, the disk 11 has an index 13 opposite which the scale 2 is read. Starting from this index 13 and proceeding along the periphery or arc, respectively, of the top disk 11, the latter has a continuously decreasing scale 14 of the height of the plants in meters or centimeters. In turning the top disk 11 the periphery or arc thereof will intersect the fields 6, 7 and 8 of the bottom disk 1. The reading marks 4 of the plant names 3 are placed so that in the angular position of the top disk 11 in which the periphery or arc, respectively, thereof passes through a certain mark 4 the line of the scale 14 which is opposite the mark 4 will indicate the height of the plant considered, while at the same time the index 13 is within the region of the month on the scale 2 during which the flowering of the plant occurs.

In the top disk 11 there is provided one aperture 15 for each ring of squares 10 on the bottom disk 1. By suitably positioning the squares 10 of each ring it has been achieved that in every angular position of the top disk 11 in which information about the height and flowering-time of a plant can be derived by means of the scales 2 and 14 the aperture 15 associated with the ring of squares 10 for the relevant principal group of plants is over a square which indicates the colour of the plant. In order to make it easier to determine in which of the apertures 15 the colour is to be read, each one of the apertures is distinctly referred to the respective portion of the scale of height 14 at the periphery of the top disk 11 by means of fields 16 provided on the surface of the top disk and clearly distinguished one from the others by different shading or colouring, each of said fields including one of the apertures 15 and the portion of the scale of height appertaining thereto. In addition to the measures of height in meters and centimeters being marked on the scale 14, the designations "trees and bushes," "perennials" and "bulb and tuber plants" are inserted within the respective surface fields 16, as seen in FIG. 2.

The part of the surface of the top disk not occupied by the fields 16 may preferably be utilized for inscriptions, e.g. about planting seasons of the various kinds of plants.

The table disk described may be modified in several respects. Among other features the periphery of the top disk 11 may have several, e.g. three, mutually stepped segments each of which forms an arc with a continuously decreasing distance from the turning point. Each of the segments may then include a scale of height valid for one of the three principal groups of plants. The index 13 may be formed as a particular highest step of the periphery of the top disk.

What is claimed is:

1. A device for deriving correlative particulars about characteristics of individual plant species determining the composition of plant groups in gardens, parks and the like, comprising a flat base member, a circular calendar scale on said base member, at least one further scale on said base member concentric with said calendar scale and containing identification marks of plant species arranged so that the radial distance thereof from said centre is a measure for the linear height of the corresponding plant species, a flat top member rotatable about the centre of said scales, an index on said top member adapted to move along said calendar scale on said base member, a scale of length on said top member extending along an arc having a continuously decreasing distance from said centre, the peripheral positions of said identification marks of plant species at the further scale on said base member being selected so that in an angular position of said top member in which the scale of length thereon intersects the identification mark of a certain plant species said index indicates the flowering-time of said plant species and the said scale of length indicates the average height thereof, a circular array of discrete fields arranged on said base member around said centre and each containing a sign representing the colour of the flowers of a corresponding plant species, and window means in said top member corresponding to said array of discrete fields on said base member, the colour of a particular plant species being indicated by the sign in one of said discrete fields through said window means in the angular position of said top member in which the scale of length of the latter intersects the identification mark of said particular plant species.

2. A device for deriving correlative particulars about characteristics of individual plant species determining the composition of plant groups in gardens, parks and the like, comprising a flat base member, a circular calendar scale on said base member, said base member being divided by circles concentric with said calendar scale into several annular fields, a further scale contained in each of said annular fields and including identification marks of a principal group of plant species whose average height falls within a limited range of magnitude, said marks in each group being arranged so that the radial distance thereof from said centre is a measure for the linear height of the corresponding plant species, a flat top member rotatable about the centre of said scales, an index on said top member adapted to move along said calendar scale on said base member, a scale of length on said top member extending along an arc having a continuously decreasing distance from said centre, the peripheral positions of said identification marks of plant species at the further scale on said base member being selected so that in an angular position of said top member in which the scale of length thereon intersects the identification mark of a certain plant species said index indicates the flowering-time of said plant species and the said scale of length indicates the average height thereof, a circular array of discrete fields arranged on said base member around said centre within the innermost of said concentric circles and each containing a sign representing the colour of the flowers of a corresponding plant species, and window means in said top member corresponding to said array of discrete fields on said base member, the colour of a particular plant species being indicated by the sign in one of said discrete fields through said window means in the angular position of said top member in which the scale of length of the latter intersects the identification mark of said particular plant species.

3. A device for deriving correlative particulars about characteristics of individual plant species determining the composition of plant groups in gardens, parks and the like, comprising a flat base member, a circular calendar scale on said base member, at least one further scale on said base member concentric with said calendar scale and containing identification marks of plant species arranged so that the radial distance thereof from said centre is a measure for the linear height of the corresponding plant species, a flat circular top member rotatable at an eccentric point thereof about the centre of said scales, the size of said top member and the degree of eccentricity being proportioned so that the point on the periphery of said top member most remote from the eccentric turning point has a path of movement along said calendar scale on said base member, an index on said top member provided at said point on the periphery thereof, a scale of length on said top member extending along an arc having a continuously decreasing distance from said centre, the peripheral positions of said identification marks of plant species at the further scale on said base member being selected so that in an angular position of said top member in which the scale of length thereon intersects the identification mark of a certain plant species said index indicates the flowering-time of said plant species and the said scale of length indicates the average height thereof, a circular array of discrete fields arranged on said base member around said centre and each containing a sign representing the colour of the flowers of a corresponding plant species, and window means in said top member corresponding to said array of discrete fields on said base member, the colour of a particular plant species being indicated by the sign in one of said discrete fields through said window means in the angular position of said top member in which the scale of length of the latter intersects the identification mark of said particular plant species.

References Cited by the Examiner

UNITED STATES PATENTS

| | | | |
|---|---|---|---|
| 2,445,008 | 7/1948 | Smidt | 235—64.7 |
| 2,597,609 | 5/1952 | Bartlett et al. | 235—84 |
| 2,615,631 | 10/1952 | Sorrels | 235—88 |
| 3,023,954 | 3/1962 | Gurney et al. | |
| 3,152,756 | 10/1964 | Meyerson | 235—88 |

LEO SMILOW, *Primary Examiner.*